(12) United States Patent
Kimijima et al.

(10) Patent No.: US 9,056,547 B2
(45) Date of Patent: Jun. 16, 2015

(54) WORK MACHINE

(75) Inventors: Kouji Kimijima, Kasama (JP); Yuuji Akutsu, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 3 days.

(21) Appl. No.: 14/128,361

(22) PCT Filed: Jun. 29, 2012

(86) PCT No.: PCT/JP2012/066774
§ 371 (c)(1),
(2), (4) Date: Dec. 20, 2013

(87) PCT Pub. No.: WO2013/002390
PCT Pub. Date: Jan. 3, 2013

(65) Prior Publication Data
US 2014/0124285 A1    May 8, 2014

(30) Foreign Application Priority Data

Jun. 30, 2011 (JP) ................................. 2011-145471

(51) Int. Cl.
*B60K 5/00* (2006.01)
*B60K 13/04* (2006.01)
(Continued)

(52) U.S. Cl.
CPC ............... *B60K 13/04* (2013.01); *E02F 3/3411* (2013.01); *E02F 9/0866* (2013.01); *F01N 13/082* (2013.01); *F01N 13/1805* (2013.01); *F01N 3/0211* (2013.01); *F01N 2450/00* (2013.01);
(Continued)

(58) Field of Classification Search
CPC ........................................................ B60K 13/04

USPC ............ 180/296, 309, 311, 89.1, 89.2, 89.17, 180/69.2, 69.24; 248/49, 58, 637
See application file for complete search history.

(56) References Cited

U.S. PATENT DOCUMENTS 4,131,172 A * 12/1978 Wolfgram .................. 180/69.24
6,655,486 B2 * 12/2003 Oshikawa et al. ........... 180/68.1
(Continued)

FOREIGN PATENT DOCUMENTS

JP    2009-79422 A    4/2009
JP    2010-106581 A    5/2010
(Continued)

OTHER PUBLICATIONS

International Search Report dated Sep. 18, 2012 w/ English translation (four pages).

*Primary Examiner* — J. Allen Shriver, II
*Assistant Examiner* — James M Dolak
(74) *Attorney, Agent, or Firm* — Crowell & Moring LLP

(57) ABSTRACT

A work machine includes: a frame; an engine; an exhaust gas control device; a compartment cover; a compartment cover supporting member; an engine hood; an exhaust gas control device supporting member that suspends the exhaust gas control device downward through the opening and supports the exhaust gas control device in a suspended state; and an opening cover, wherein: the exhaust gas control device supporting member includes a mounting portion that is attached to the exhaust gas control device and a fastening portion that is supported by, and fastened to, the reinforcing member, and when the fastening portion is unfastened, the exhaust gas control device supporting member is removable above the opening together with the exhaust gas control device attached to the mounting portion.

4 Claims, 9 Drawing Sheets

(51) Int. Cl.
*B62D 25/10* (2006.01)
*E02F 3/34* (2006.01)
*E02F 9/08* (2006.01)
*F01N 13/08* (2010.01)
*F01N 13/18* (2010.01)
*F01N 3/021* (2006.01)

(52) U.S. Cl.
CPC ......... *F01N 2450/16* (2013.01); *F01N 2590/08* (2013.01); *Y02T 10/20* (2013.01)

(56) References Cited

U.S. PATENT DOCUMENTS

| | | | |
|---|---|---|---|
| 7,131,422 B2 * | 11/2006 | Kimura et al. | 123/198 E |
| 7,134,518 B2 * | 11/2006 | Arai et al. | 180/68.1 |
| 7,717,205 B2 * | 5/2010 | Kertz et al. | 180/68.3 |
| 7,967,094 B2 * | 6/2011 | Matsushita et al. | 180/69.2 |
| 7,992,665 B2 * | 8/2011 | Giovannini et al. | 180/69.2 |
| 8,381,865 B2 * | 2/2013 | Okada | 180/309 |
| 8,505,661 B2 * | 8/2013 | Tsuji et al. | 180/68.4 |
| 8,550,198 B2 * | 10/2013 | Isaka et al. | 180/68.1 |
| 8,573,646 B2 * | 11/2013 | Kamiya | 180/89.2 |
| 8,646,556 B2 * | 2/2014 | Shimada et al. | 180/69.2 |
| 2011/0000199 A1 | 1/2011 | Ezawa et al. | |

FOREIGN PATENT DOCUMENTS

| | | |
|---|---|---|
| JP | 2010-138832 A | 6/2010 |
| JP | 2010-215122 A1 | 9/2010 |
| WO | WO 2008/136203 A1 | 11/2008 |
| WO | WO 2010/004805 A1 | 1/2010 |

* cited by examiner

WORK MACHINE

TECHNICAL FIELD

The present invention relates to a work machine such as a wheel loader.

BACKGROUND ART

A work machine such as a wheel loader or a hydraulic excavator includes a machine compartment defined by a compartment cover where an engine, engine accessories and the like are disposed. The engine accessories may include, for instance, a radiator used to cool the engine and an exhaust emission control device equipped with a filter that collects particulates contained in the exhaust gas discharged from the engine. Among such accessories, the exhaust emission control device is fastened to a mount that may be attached to, for instance, the engine (see patent literature 1).

CITATION LIST

Patent Literature

Patent Literature 1: Japanese laid open patent publication No. 2010-138832

SUMMARY OF INVENTION

Technical Problem

An exhaust emission control device fastened to a mount attached to the engine, as in the work machine described in patent literature 1 cited above, is installed at a position set apart from the engine, and this positional arrangement tends to allow the exhaust emission control device to vibrate readily as the engine vibrates. Thus, there is a concern that the extent of such vibration of the exhaust emission control device may exceed the acceleration tolerance of the filter in the exhaust emission control device or the various sensors mounted at the exhaust emission control device. In addition, as work machines today often come equipped with a greater variety of accessory devices including a supercharger and an EGR cooler, it is becoming increasingly difficult to attach the mount, to which the exhaust emission control device is to be fastened, to the engine within the very limited space.

Solution To Problem

A work machine according to a first aspect of the present invention comprises: a frame of the work machine; an engine supported by the frame inside a machine compartment of the work machine; an exhaust emission control device including a filter that collects particulates contained in exhaust gas discharged from the engine; a compartment cover that defines the machine compartment; a compartment cover supporting member that supports the compartment cover and is disposed on the frame; an engine hood that is supported by at least the compartment cover supporting member and includes a top plate shielding the machine compartment above the engine, an opening formed at the top plate, through which the exhaust emission control device is lifted up out of the machine compartment, and a reinforcing member disposed at an edge of the opening, that bears a supporting load of the exhaust emission control device; an exhaust emission control device supporting member that suspends the exhaust emission control device downward through the opening and supports the exhaust emission control device in a suspended state; and an opening cover that is detachably mounted at the engine hood and closes off or opens up the opening, wherein: the exhaust emission control device supporting member includes a mounting portion that is attached to the exhaust emission control device and a fastening portion that is supported by, and fastened to, the reinforcing member, and when the fastening portion is unfastened, the exhaust emission control device supporting member is removable above the opening together with the exhaust emission control device attached to the mounting portion.

According to a second aspect of the present invention, in the work machine according to the first aspect, it is preferable that an L-shaped member that includes a frontward ranging portion ranging frontward and a downward ranging portion ranging downward, intersecting each other at a substantially right angle so as to form a substantially L-shaped section viewed from a side of the work machine, is disposed at a front end of the engine hood, and a front end of the reinforcing member extending along a front/rear direction is connected to a surface of the downward ranging portion located on a rear side; the front end of the engine hood is supported with a lower surface of the frontward ranging portion set in contact with an upper surface of a hydraulic oil tank; and a rear end of the engine hood is supported by the compartment cover supporting member.

According to a third aspect of the present invention, in the work machine according to the first or second aspect, it is preferable that a height of the top plate is set smaller than the height of an upper surface of the opening cover.

According to a fourth aspect of the present invention, in the work machine according to the first through aspects, the exhaust emission control device supporting member may include a fastening member as the fastening portion, a mounting member as the mounting portion and an elastic member disposed between the fastening member and the mounting member, and the mounting member may be supported by the fastening member via the elastic member.

Advantageous Effect of the Invention

According to the present invention, the extent of vibration of the exhaust emission control device can be minimized, and thus, improvements in the durability and reliability of the exhaust emission control device are achieved.

DESCRIPTION OF EMBODIMENT

Figure 1:
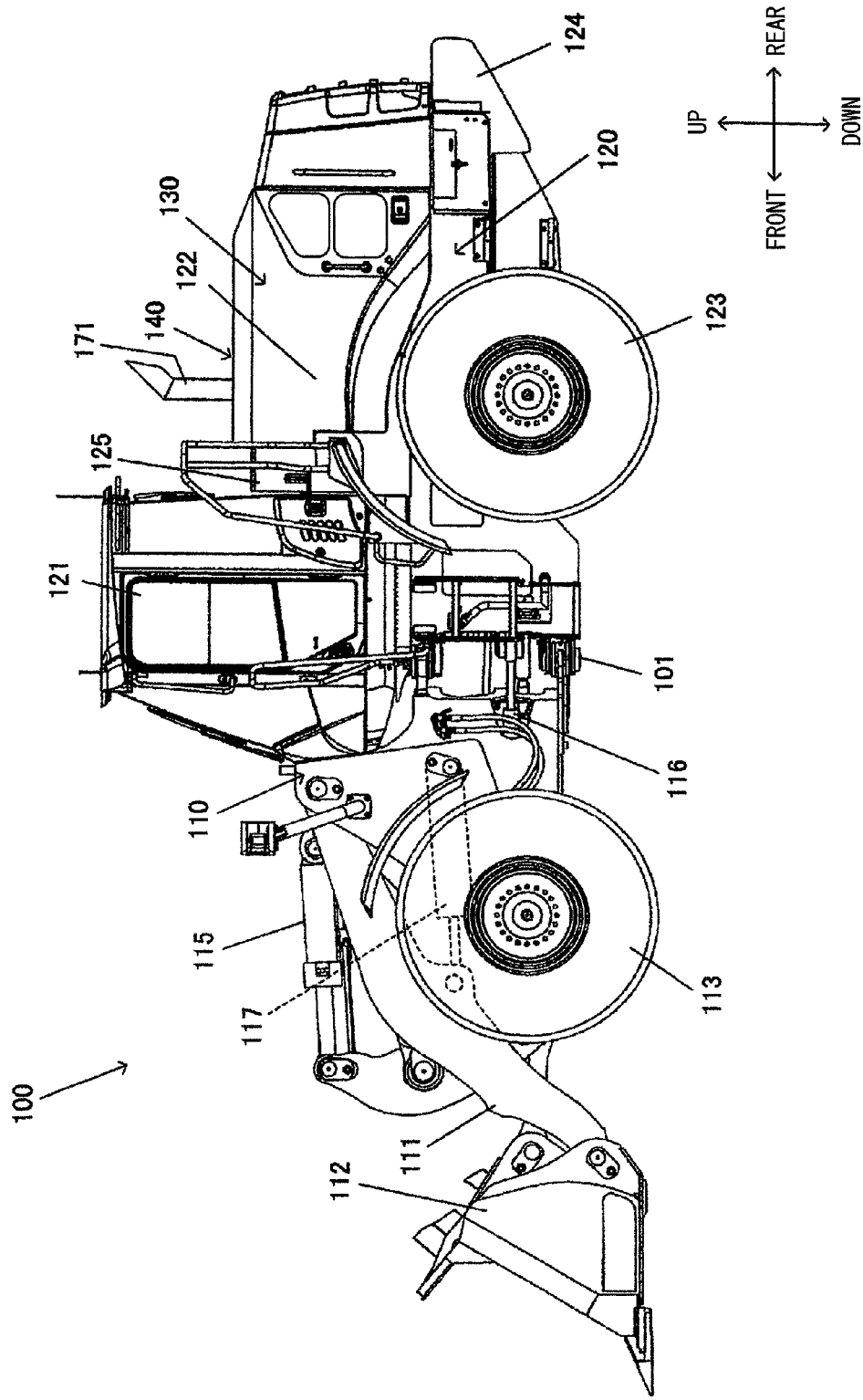
FIG. 1 is a side elevation of a wheel loader achieved in an embodiment of the present invention.

In reference to FIGS. 1 through 9, an embodiment of a work machine according to the present invention will be described. FIG. 1 presents a side elevation of a wheel loader embodying the work machine. The wheel loader 100 comprises a front body 110 that includes an arm 111, a bucket 112, tires 113 and the like, and a rear body 120 that includes an operator's cab 121, a machine compartment (engine compartment) 122, tires 123 and the like. The engine compartment 122 is shielded with an engine hood 140 at its top and a compartment cover 130, which can be opened and closed, at a side thereof. A counterweight 124 is attached at the rear of the rear body 120. A hydraulic oil tank 125 is disposed to the front of the engine compartment 122.

An arm cylinder 117 drives the arm 111 so that the arm swings up/down (so that the arm is elevated/lowered), whereas the bucket 112, driven by a bucket cylinder 115, swings up/down (excavates/dumps). The front body 110 and the rear body 120 are linked to each other via a center pin 101 so as to be able to rotate relative to each other and as a steering cylinder 116 extends/contracts, the front body 110 articulates left/right relative to the rear body 120. In order to describe the embodiment clearly, directional terms such as front, rear, left, right, up and down are used as defined in the various figures. In addition, a given drawing, in reference to which the embodiment will be described below, may not include an illustration of some members in part or in their entirety, among the members configuring the wheel loader 100, the illustration of which needs to be omitted in order to facilitate the explanation.

Figure 2:
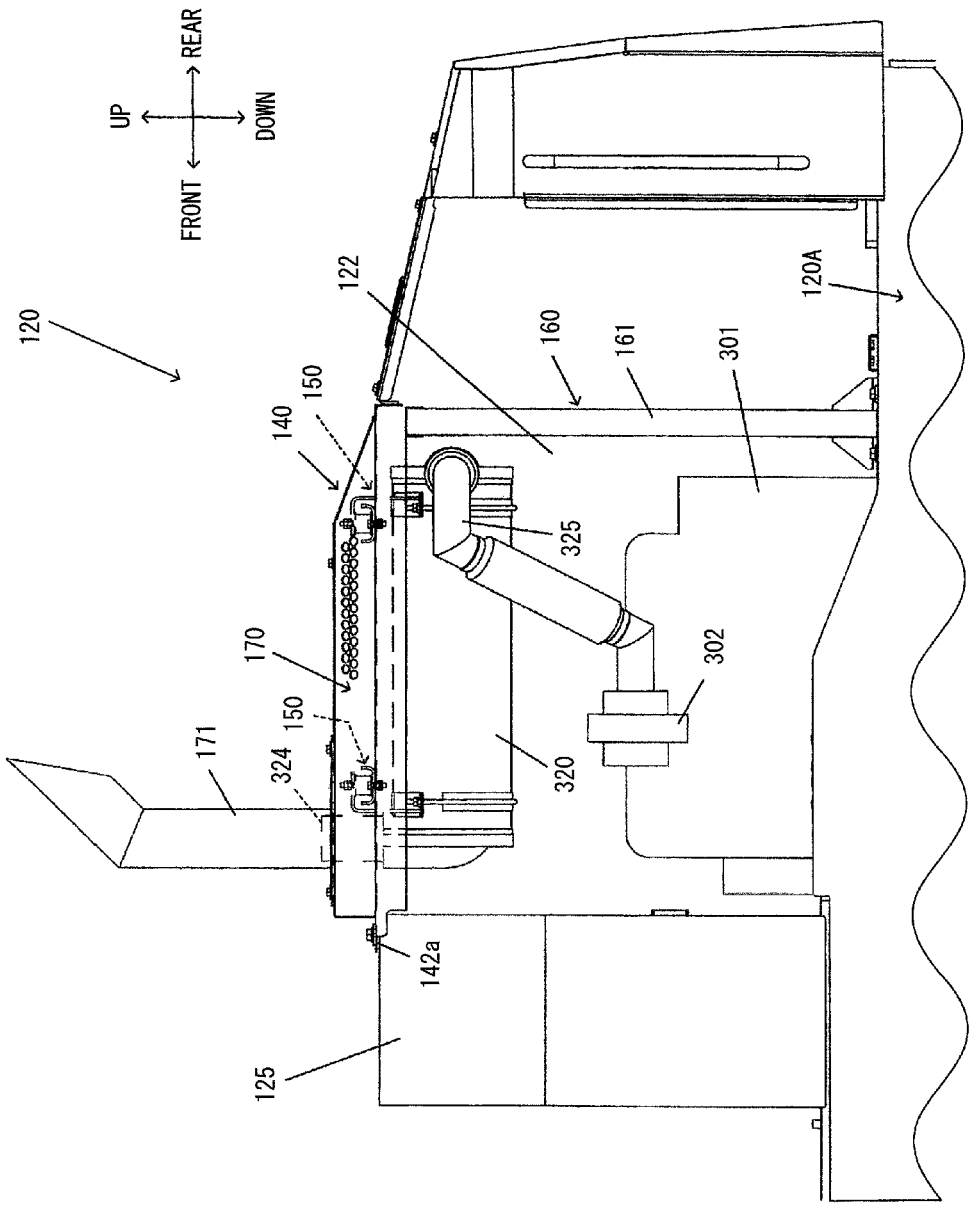
FIG. 2 provides a view of the rear body of the wheel loader in FIG. 1, from the left side.

FIG. 2 provides a side elevation of the rear body 120 viewed from the left side, with the compartment cover 130 disengaged from the left side surface thereof. In the engine compartment 122, an engine 301 is mounted at an engine mounting bracket (not shown) at a frame 120A of the rear body 120. It is to be noted that various accessories, including an EGR (exhaust gas recirculation) cooler, are mounted at the engine 301. A supercharger (turbocharger) 302 is one of such accessories.

Figure 3:
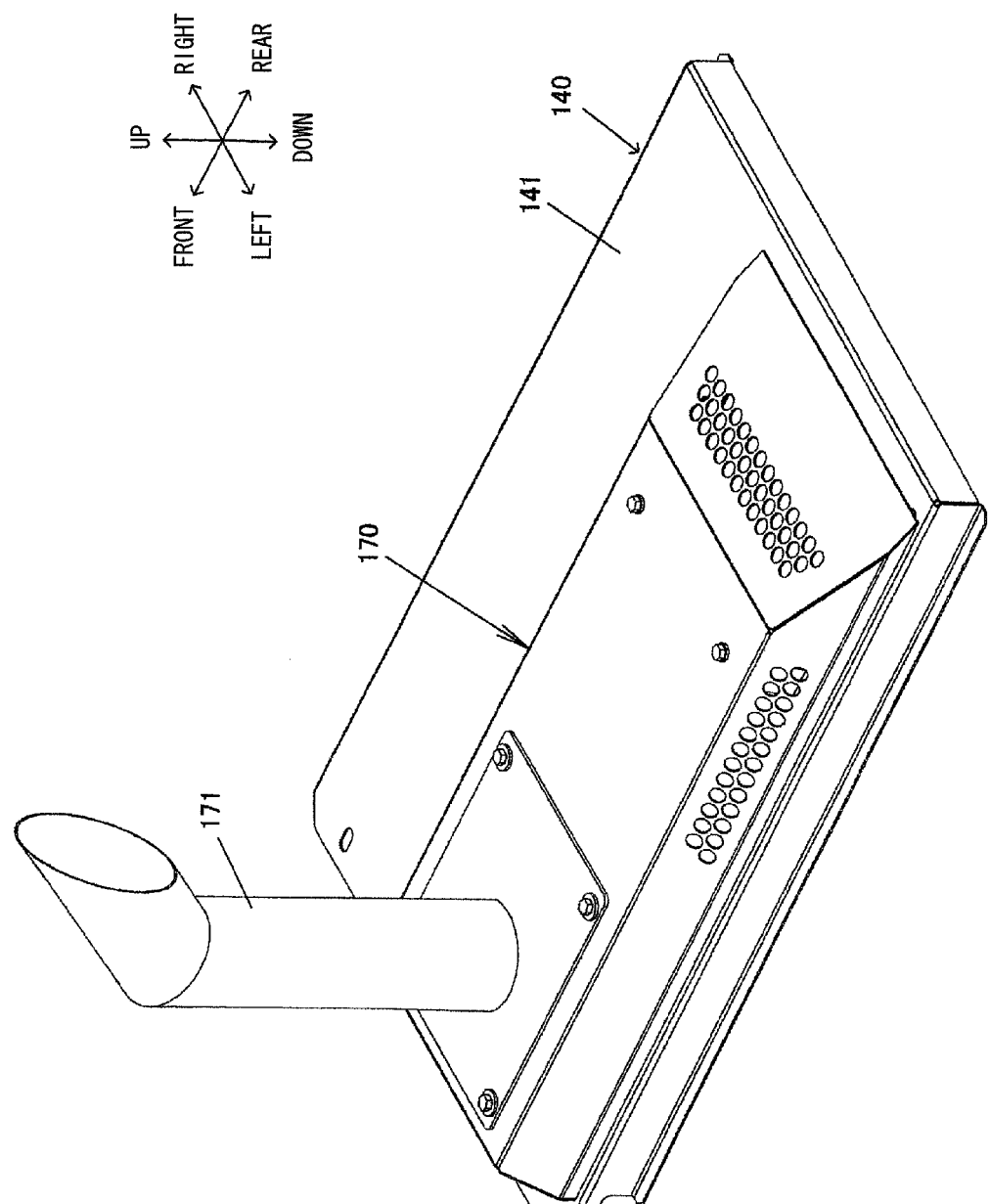
FIG. 3 shows the engine hood in a perspective.
Figure 4:
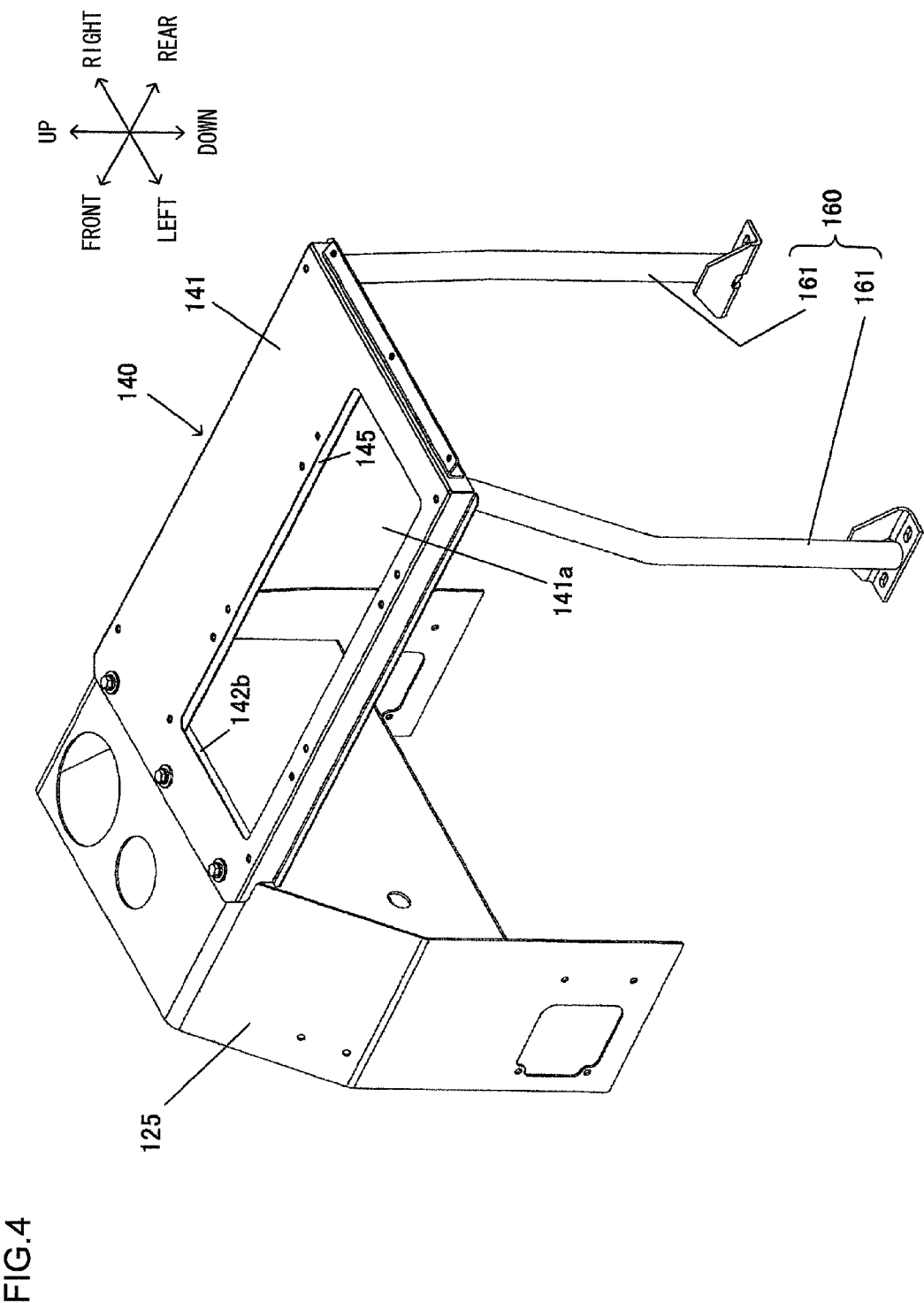
FIG. 4 provides a perspective illustrating how the engine hood is installed.
Figure 5:
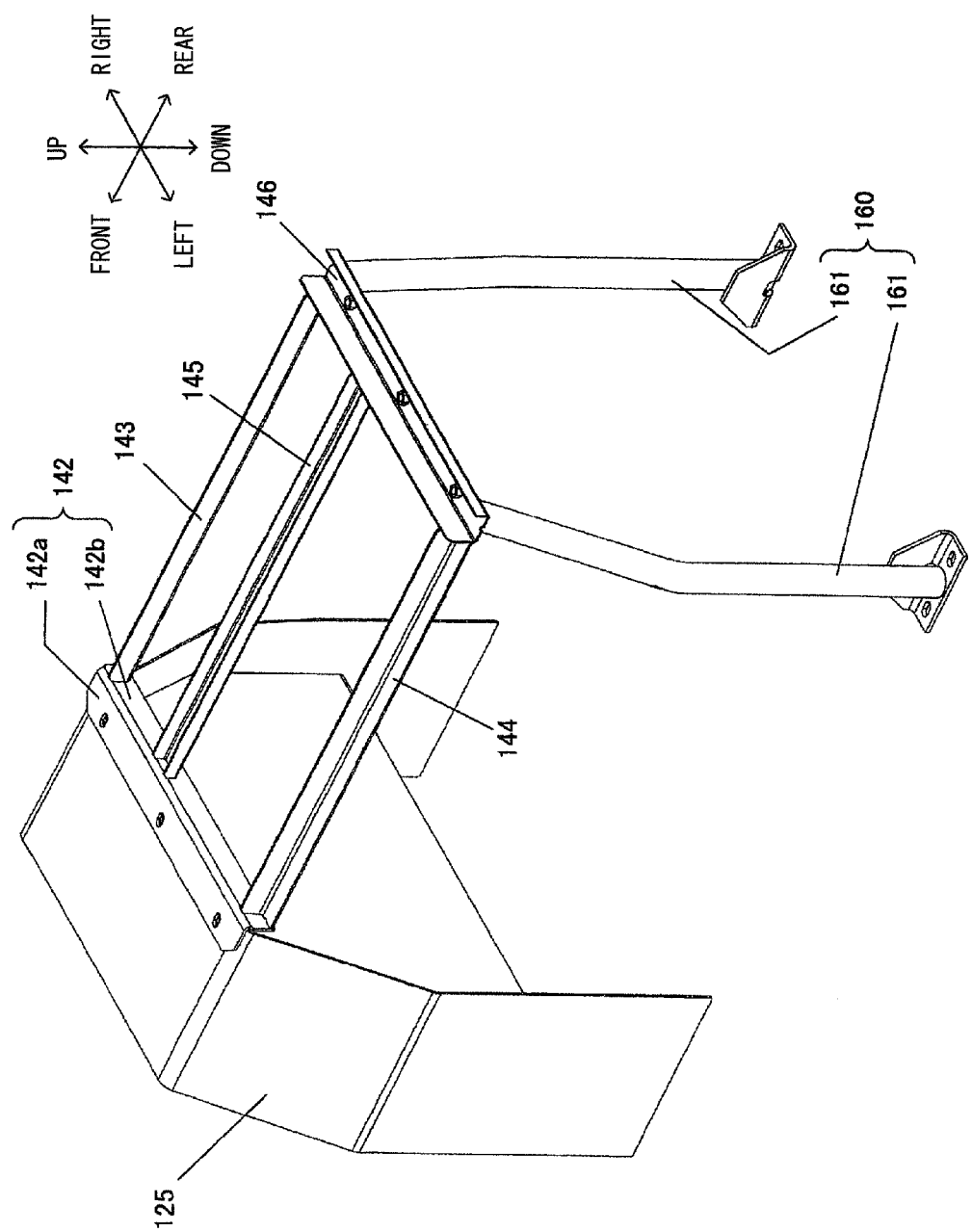
FIG. 5 provides a perspective illustrating how the engine hood is installed.

An exhaust emission control device 320, suspended from the engine hood 140 and supported in this suspended state as will be described later, is disposed above the engine 301 in the engine compartment 122. As explained earlier, the engine hood 140 is disposed at the top of the engine compartment 122. FIG. 3 shows the engine hood 140 in a perspective, and FIGS. 4 and 5 provide perspectives of the engine hood 140 in reference to which the installation of the engine hood 140 will be described. It is to be noted that in order to assure better clarity in the illustration, FIG. 5 does not show a top plate 141, which is part of the engine hood 140, as will be described below. The engine hood 140 includes the top plate 141, which shields the engine compartment 122 and reinforcing members 142 through 146, which reinforce the engine hood 140. In addition, an opening cover 170, which will be described in detail later, is mounted at the engine hood 140 (see FIG. 3).

The top plate 141 is a plate member having the left and right side ends thereof and the rear end thereof all bent downward. An exhaust emission control device installation opening 141a is formed in the top plate 141. As will be explained later, the exhaust gas scrubbing device installation opening 141a is formed at the engine hood 140 so as to allow the exhaust emission control device 320 to be mounted/dismounted without having to disengage the engine hood 140. As FIG. 5 indicates, the reinforcing members 142 through 146 are disposed at the lower surface of the top plate 141.

The reinforcing member 142 is an L-shaped member that includes a frontward ranging portion 142a ranging frontward and a downward ranging portion 142b ranging downward, which intersect each other at a substantially right angle so as to form a substantially L-shaped section viewed from a side of the wheel loader 100. The reinforcing member 142, disposed at the front end of the engine hood 140, extends along the left/right direction. The front ends of the reinforcing members 143 through 145, all extending along the front/rear direction, are connected to the rear surface of the downward ranging portion 142b. The reinforcing member 143 is a right-side member that extends along the front/rear direction, whereas the reinforcing member 144 is a left-side member that extends along the front/rear direction. The reinforcing member 145 disposed further rightward relative to the exhaust emission control device installation opening 141a, extends along the front/rear direction without interfering with the exhaust emission control device installation opening 141a. The rear ends of the reinforcing members 143 through 145 are connected to the reinforcing member 146, which is located at the rear end of the engine hood 140 and extends along the left/right direction.

At its front end, the engine hood 140 is supported with the lower surface of the frontward ranging portion 142a of the reinforcing member 142 set in contact with the upper surface of the hydraulic oil tank 125, whereas at its rear end, the reinforcing member 146 is supported by a compartment cover supporting member 160. The compartment cover supporting member 160 includes a pair of support posts 161, one disposed on the left side and the other disposed on the right side, each extending upright from the frame 120A of the rear body 120. It is to be noted that the compartment cover supporting member 160 provides additional strength to the engine hood 140 and, in particular, to the reinforcing member 146.

Figure 6:
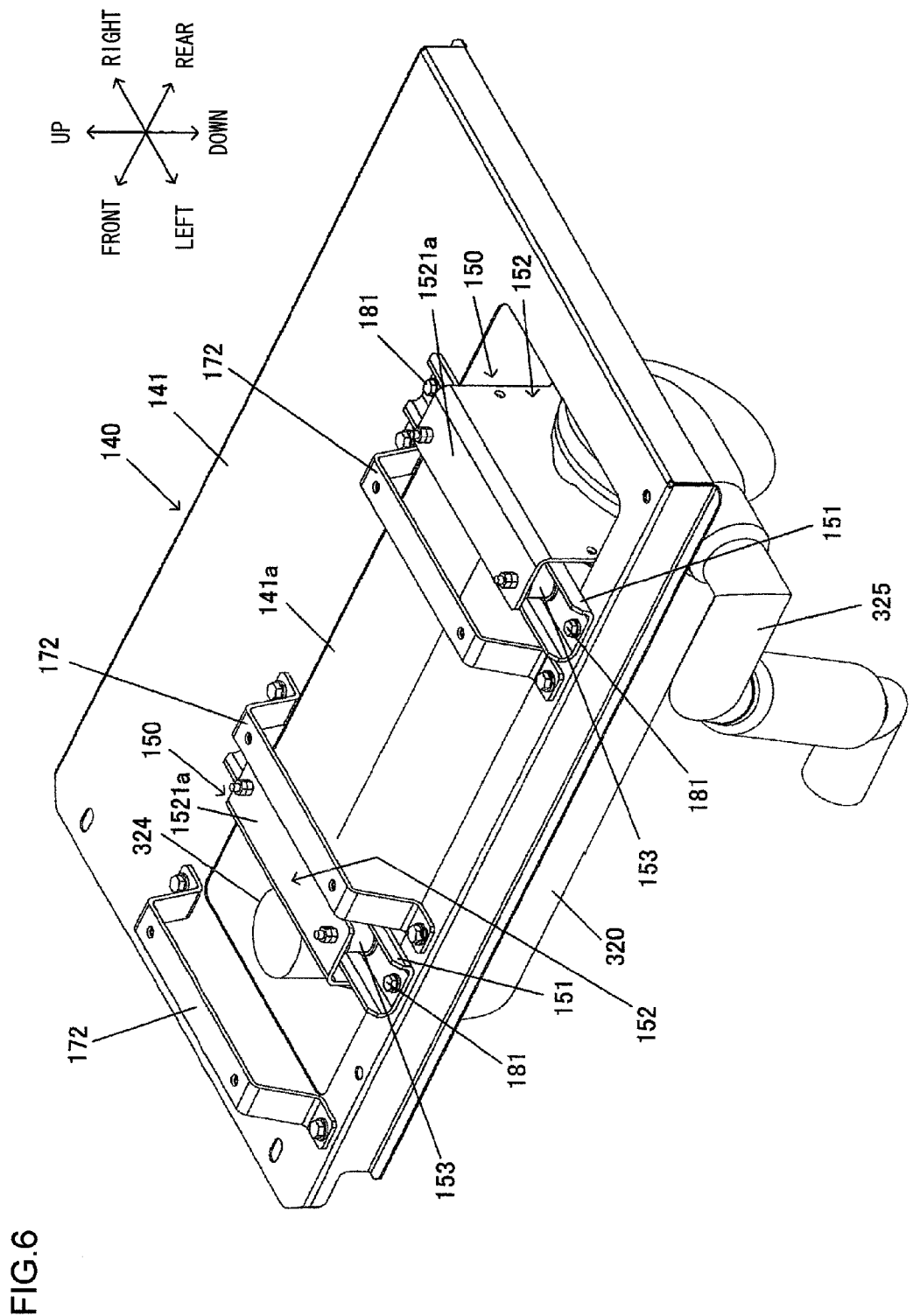
FIG. 6 shows the engine hood without the opening cover in a perspective.

As FIGS. 3 and 4 clearly indicate, the exhaust emission control device installation opening 141a at the top plate 141 of the engine hood 140 is closed off by an opening cover 170. The opening cover 170, at which an exhaust outlet port (not shown) is formed, is detachably mounted with bolts or the like, at the engine hood 140 via brackets 172 shown in FIG. 6. It is to be noted that FIG. 6 shows the engine hood 140 without the opening cover 170 in a perspective. At the exhaust outlet port formed in the opening cover 170, through which exhaust gas, having undergone a cleaning and noise reduction process in the exhaust emission control device 320, is emitted to the outside, a tailpipe 171 via which the exhaust gas is discharged is mounted. The exhaust gas travels from the engine compartment 122 through the tailpipe 171 before it is emitted into the atmosphere.

In the embodiment, the height of the upper surface of the opening cover 170 is set greater than the height of the upper surface of the top plate 141 at the engine hood 140, as indicated in FIG. 3. By adjusting the heights of the upper surfaces in this manner, it is ensured that the opening cover 170 and exhaust emission control device mounting brackets 150 do not interfere with each other. As will be explained later, the exhaust emission control device mounting brackets 150 are configured so that they support the exhaust emission control device 320 suspended therefrom through the exhaust emission control device installation opening 141a at the top plate 141. In other words, the height of the engine hood 140 is minimized outside the areal range over which it must be ensured that the engine hood 140 does not interfere with the exhaust emission control device mounting brackets 150 in the embodiment. These measures are taken so as to assure good rearward visibility by minimizing the height of the engine hood 140 located to the rear of the operator's cab 121.

Figure 7:
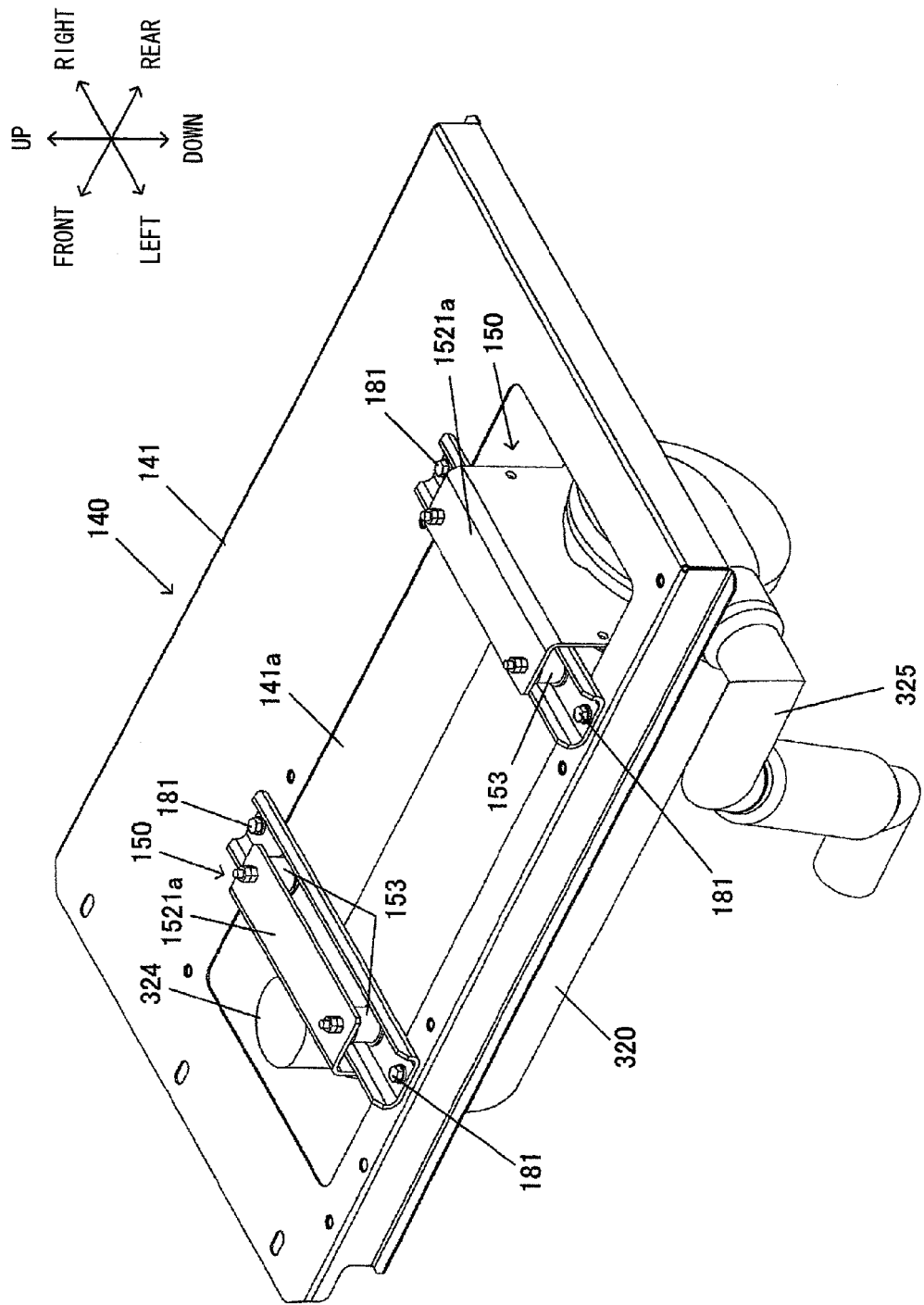
FIG. 7 illustrates how the exhaust emission control device is installed.
Figure 8:
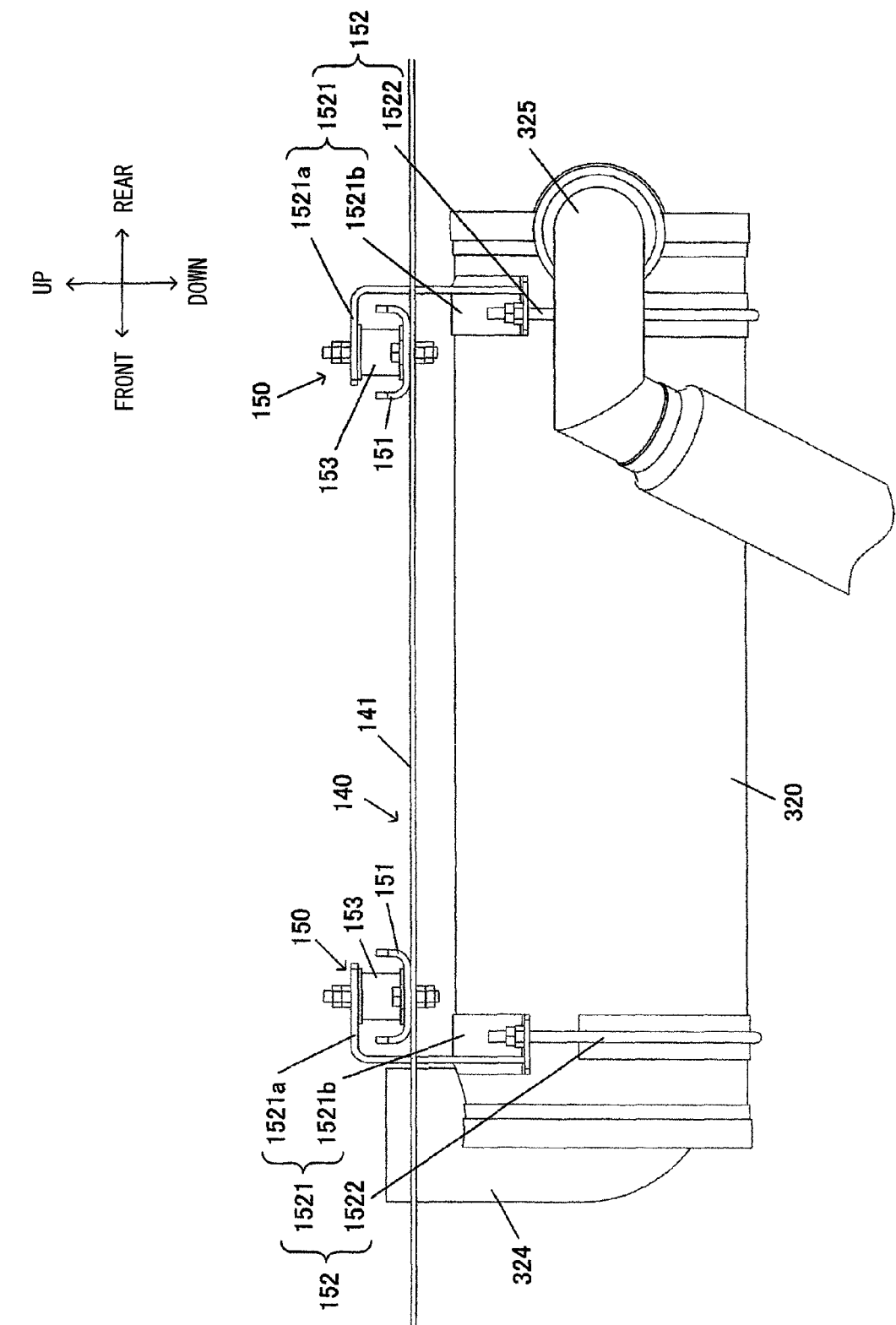
FIG. 8 illustrates how the exhaust emission control device is installed.
Figure 9:
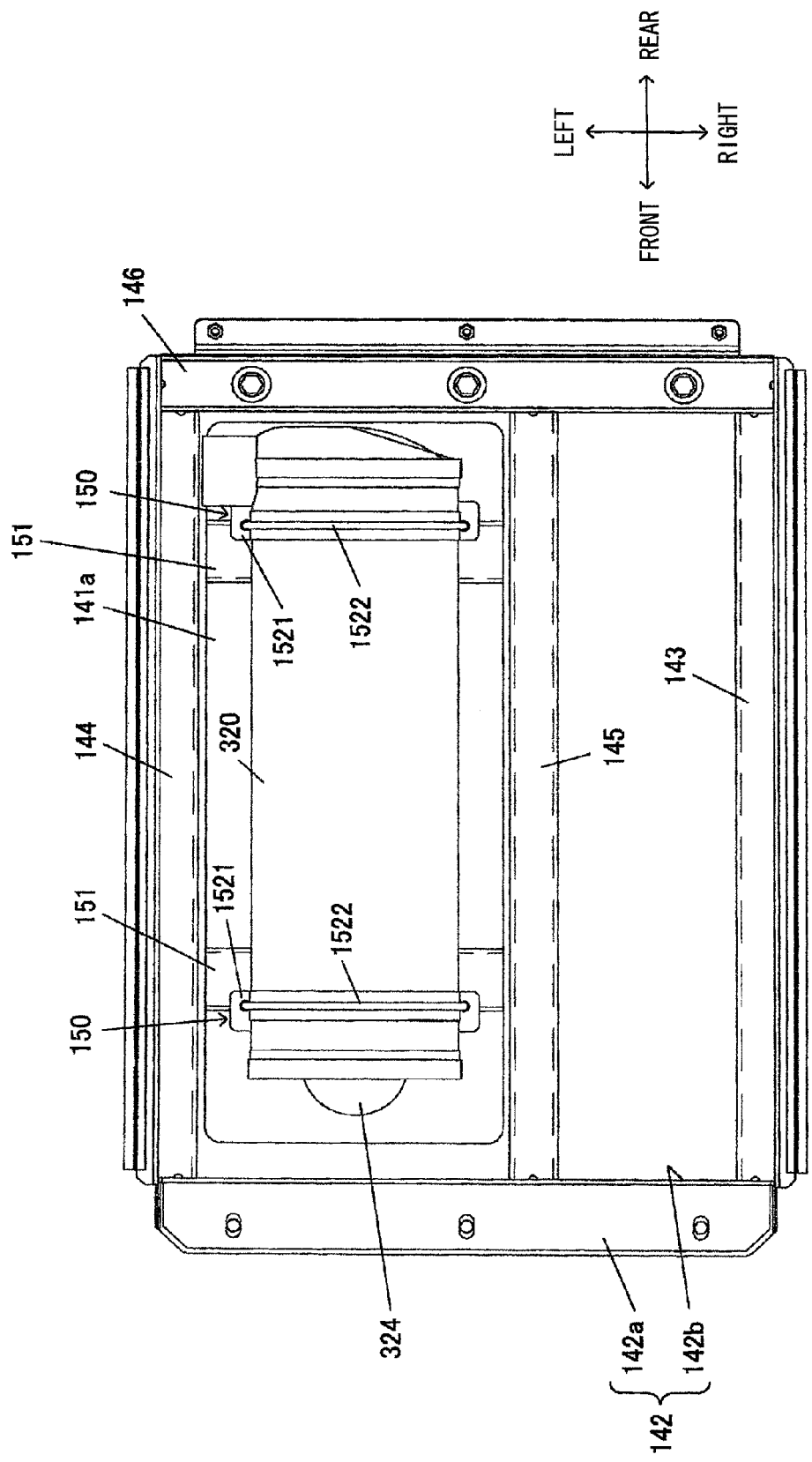
FIG. 9 illustrates how the exhaust emission control device is installed.

FIGS. 7 through 9 show essential components relevant to an explanation of the installation of the exhaust emission control device 320 in relation to the engine hood 140. FIG. 7 provides a perspective, FIG. 8 provides a side elevation and FIG. 9 provides a bottom view. It is to be noted that FIG. 8 does not include an illustration of the reinforcing member 144. As explained earlier, the exhaust emission control device mounting brackets 150 are brackets used to suspend the exhaust emission control device 320 from the engine hood 140 and support the exhaust emission control device 320 in the suspended state. The exhaust emission control device mounting brackets 150 are mounted at two locations in the embodiment, at a position near the front of the exhaust emission control device 320 and at a position near the rear of the exhaust emission control device 320. The exhaust emission control device mounting brackets 150 each include a fastening member 151 that is fastened to the engine hood 140, a mounting member 152 that is attached to the exhaust emission control device 320 and a vibration-proofing member 153 that is inserted between the fastening member 151 and the mounting member 152 so as to absorb vibration.

The fastening member 151 fulfills the role of a fastening portion at which the exhaust emission control device mounting bracket 150 is fastened to the engine hood 140. The fastening member 151 extends along the left/right direction above the exhaust emission control device installation opening 141a. The right end of the fastening member 151, set above the reinforcing member 145, and the left end of the fastening member 151, set above the reinforcing member 144, are placed on the engine hood 140 in this state and the fastening member 151 is fastened to the engine hood 140 via, for instance, bolts 181 or the like.

The mounting member 152 fulfills the role of a mounting portion that is attached to the exhaust emission control device 320. The mounting member 152 includes a suspending member 1521 for suspending the exhaust emission control device 320 via the fastening member 151 and the vibration-proofing member 153 and a U-bolt 1522 used to attach the exhaust emission control device 320 to a lower portion of the suspending member 1521. The suspending member 1521 includes a bent portion 1521a located at the top thereof, which is bent at a substantially right angle, and a strap-like portion 1521b, which is located at a lower area, forming a circular arc so as to range along the outer circumference of the exhaust emission control device 320 assuming a substantially cylindrical shape. The exhaust emission control device 320 is held between the lower surface of the strap-like portion 1521b and the U-bolt 1522 supporting the exhaust emission control device 320 at the bottom thereof and is attached to the mounting member 152 in this state. It is to be noted that a belt-shaped member forming a circular arc so as to range along the outer circumference of the exhaust emission control device 320 may be disposed between the exhaust emission control device 320 and the U-bolt 1522, as shown in FIGS. 8 and 9.

The vibration-proofing member 153 includes a portion constituted of an elastic material such as rubber, which absorbs vibration, and a portion fastened to the fastening member 151 and the mounting member 152.

As the exhaust emission control device mounting brackets 150 structured as described above are fastened to the engine hood 140, the right ends of the fastening members 151, set above the reinforcing member 145, and the left end of the fastening member 151, set above the reinforcing member 144, are placed on the engine hood 140, as explained earlier. Thus, as the exhaust emission control device mounting brackets 150 are fastened to the engine hood 140, the exhaust emission control device 320 becomes supported by the reinforcing members 144 and 145 at the engine hood 140 via the exhaust emission control device mounting brackets 150. In other words, the load of the exhaust emission control device 320 is borne by the reinforcing members 144 and 145.

The front ends and the rear ends of the reinforcing members 144 and 145 are connected to the reinforcing member 142 and the reinforcing member 146 respectively. In addition, the reinforcing member 142 is supported with the lower surface of its frontward ranging portion 142a set in contact with the upper surface of the hydraulic oil tank 125, and the reinforcing member 146 is supported by the compartment cover supporting member 160.

The exhaust emission control device 320, which assumes a substantially cylindrical shape, as described earlier, includes an oxidation catalyst portion (not shown), a DPF (diesel particulate filter) portion (not shown) and a noise reducing portion (not shown), which are connected in this order along the flow of the exhaust gas, starting from the upstream side. In the oxidation catalyst portion, an oxidation catalyst (not shown) is housed. In the DPF portion, a particulate removing filter (not shown) is housed. The noise reducing portion is configured with a device that reduces exhaust noise generated at the engine 301. An exhaust pipe 324 is mounted at an exhaust gas outlet of the noise reducing portion. As shown in FIG. 2, a gap is formed between the exhaust pipe 324 and the tailpipe 171 mounted at the opening cover 170. It is to be noted that FIG. 2 also shows an exhaust pipe 325 that connects the supercharger 302 with the exhaust emission control device 320. The exhaust emission control device 320, assuming a substantially cylindrical shape, is disposed so as to set the direction along which the axis of the cylinder extends in substantial alignment with the front/rear direction of the wheel loader 100 on the upper left side of the engine compartment 122.

When the exhaust emission control device 320 needs to be inspected or replaced, the opening cover 170 can be disengaged from the engine hood 140, as shown in FIG. 6, so as to expose the exhaust emission control device 320 through the exhaust emission control device installation opening 141a. In this state, a pressure difference sensor (not shown), which detects the pressure difference between the exhaust gas pressure on the intake side of the particulate removing filter and the exhaust gas pressure on the outlet side of the particulate removing filter, for instance, and the like can be inspected with ease. In addition, by disengaging the brackets 172 from the engine hood 140, as shown in FIG. 7, loosening the bolts 181 that fasten the fastening members 151 of the exhaust emission control device mounting brackets 150 to the engine hood 140 and disconnecting the exhaust emission control device 320 from the exhaust pipe 325, the exhaust emission control device 320 mounted at the exhaust emission control device mounting brackets 150 can be dismounted with ease via the exhaust emission control device installation opening 141a without having to disengage the engine hood 140.

The wheel loader 100 in the embodiment described above achieves the following advantages.

(1) At the engine hood 140, with the front-end reinforcing member 142 and the rear-end reinforcing member 146 thereof respectively supported by the hydraulic oil tank 125 and the compartment cover supporting member 160, the exhaust emission control device 320, suspended by the exhaust emission control device mounting brackets 150 through the exhaust emission control device installation opening 141a, is supported in the suspended state. Since vibration of the engine 301 is not readily transmitted to the exhaust emission control device 320 installed as described above, vibration of the exhaust emission control device 320 is minimized. As a result, malfunction of the particulate removing filter, the sensors (not shown) and the like attributable to vibration can be effectively prevented, which, in turn, makes it possible to reduce costs associated with replacement of the particulate removing filter, the sensors and the like. Moreover, an improvement in the durability and reliability of the exhaust emission control device 320 is achieved.

Furthermore, the exhaust emission control device 320 can be installed without requiring a mount or the like at the engine 301. Thus, since a mount or the like, which would need to be installed in a very limited installation space so as not to interfere with the installation of the accessories for the engine 301, does not need to be installed, the restrictions imposed with respect to the installation position of the exhaust emission control device 320 are lessened and the installation layout for the accessories for the engine 301 can be designed with a higher level of freedom.

(2) Once the opening cover 170 and the brackets 172 are disengaged from the engine hood 140, the bolts 181 fastening the fastening members 151 of the exhaust emission control device mounting brackets 150 to the engine hood 140 are loosened and the exhaust emission control device 320 and the exhaust pipe 325 are disengaged from each other, the exhaust emission control device 320 can be dismounted with ease via the exhaust emission control device installation opening 141$a$ without having to disengage the engine hood 140. As a result, maintenance work on the exhaust emission control device 320 can be performed with better ease.

(3) The front end of the engine hood 140 is supported with the lower surface of the frontward ranging portion 142$a$ of the reinforcing member 142 set in contact with the upper surface of the hydraulic oil tank 125. In addition, the front ends of the reinforcing members 143 through 145 are connected to the rear surface of the rearward ranging portion 142$b$ of the reinforcing member 142. Through these measures, the height of the upper surface of the top plate 141 at the engine hood 140 can be set substantially equal to the height of the upper surface of the hydraulic oil tank 125. As a result, good rearward visibility from the operator's cab 121 is assured by minimizing the height of the upper surface of the top plate 141 at the engine hood 140 while, at the same time, sustaining a high level of strength at the engine hood 140.

(4) The height of the upper surface of the top plate 141 at the engine hood 140 is set smaller than the height of the upper surface of the opening cover 170. As a result, good rearward visibility from the operator's cab 121 is assured by minimizing the height of the engine hood 140 outside the areal range over which interference with the exhaust emission control device mounting brackets 150 must be avoided.

(5) The exhaust emission control device mounting brackets 150 each include a vibration-proofing member 153 disposed between the fastening member 151 and the mounting member 152 to absorb vibration. Since the presence of the vibration-proofing member 153 disallows a ready transmission of vibration from the engine hood 140 toward the exhaust emission control device 320, malfunction of the particulate removing filter, the sensors (not shown) and the like attributable to vibration is prevented so as to minimize costs associated with replacing the particulate removing filter, the sensors and the like and improve the durability and the reliability of the exhaust emission control device 320.

Variations (1) While the exhaust emission control device mounting brackets 150 are disposed at two locations, one at a position near the front of the exhaust emission control device 320 and the other at a position near the rear of the exhaust emission control device 320, in the embodiment described above, the present invention is not limited to this example. An exhaust emission control device mounting bracket 150 may be disposed at a single location or exhaust emission control device mounting brackets 150 may be disposed at three or more locations.

(2) While the vibration-proofing member 153 is inserted between the fastening member 151 and the mounting member 152 in the embodiment described above, the present invention is not limited to this example. For instance, the fastening member 151 and the mounting member 152 may be formed as an integrated unit and in this case, an elastic member for vibration absorption may be inserted between the lower surface of the fastening member 151 and the upper surface of the top plate 141.

(3) While the work machine according to the present invention is embodied as the wheel loader 100 in the description provided above, the present invention may be adopted in another type of work machine such as a hydraulic excavator.

(4) The embodiment and variations thereof described above may be adopted in any combination.

It is to be noted that the present invention is in no way limited to any of the particulars of the embodiment described above and that work machines adopting various structures, including a frame for a work machine, an engine supported by the frame inside a machine compartment of the work machine, an exhaust emission control device that includes a filter that collects particulates contained in exhaust gas discharged from the engine, a compartment cover that forms (defines) the external shape of the machine compartment, a compartment cover supporting member that supports the compartment cover and is disposed on the frame, an engine hood that includes a top plate shielding the machine compartment above the engine, an opening formed at the top plate, through which the exhaust emission control device is lifted up out of the machine compartment and a reinforcing member disposed at an edge of the opening and is load-bearing member supporting the exhaust emission control device, that includes and is supported at least by the compartment cover supporting member, an exhaust emission control device supporting member that suspends the exhaust emission control device downward through the opening and supports the exhaust emission control device in a suspended state and an opening cover detachably mounted at the engine hood, which closes off or opens up the opening, and characterized in that the exhaust emission control device supporting member includes a mounting portion that is attached to the exhaust emission control device and a fastening portion supported by and fastened to the reinforcing member, and that once the fastening portion is unfastened, the exhaust emission control device supporting member can be disengaged and removed upward and out of the opening together with the exhaust emission control device attached to the mounting portion, are all within the scope of the present invention.

The work machine achieved in the embodiment described above includes an engine hood having a top plate shielding the machine compartment above the engine, an opening formed at the top plate, through which the exhaust emission control device is lifted up out of the machine compartment and a reinforcing member disposed at an edge of the opening and bearing the supporting load of the exhaust emission control device. The engine hood is supported by at least a compartment cover supporting member. The exhaust emission control device is suspended downward by an exhaust emission control device supporting member via the opening at the engine hood and is supported in the suspended state. These structural features make it possible to damp vibration of the exhaust emission control device, and thus, the durability and the reliability of the exhaust emission control device can be improved.

While the embodiment and variations thereof are described above, the present invention is in no way limited to the particulars of the embodiment and the variations and any modes conceivable within the scope of the technical teachings of the present invention are also within the scope of the present invention.

The disclosure of the following priority application is herein incorporated by reference:
Japanese Patent Application No. 2011-145471 filed Jun. 30, 2011

The invention claimed is:

1. A work machine comprising:
a frame of the work machine;
an engine supported by the frame inside a machine compartment of the work machine;
an exhaust gas control device including a filter that collects particulates contained in exhaust gas discharged from the engine;
a compartment cover that defines the machine compartment;
a compartment cover supporting member that supports the compartment cover and is disposed on the frame;
an engine hood that is supported by at least the compartment cover supporting member and includes a top plate shielding the machine compartment above the engine, an opening formed at the top plate, through which the exhaust gas control device is lifted up out of the machine compartment, and a reinforcing member disposed at an edge of the opening, that bears a supporting load of the exhaust gas control device;
an exhaust gas control device supporting member that suspends the exhaust gas control device downward through the opening and supports the exhaust gas control device in a suspended state; and
an opening cover that is detachably mounted at the engine hood and closes off or opens up the opening, wherein:
the exhaust gas control device supporting member includes a mounting portion that is attached to the exhaust gas control device and a fastening portion that is supported by, and fastened to, the reinforcing member, and when the fastening portion is unfastened, the exhaust gas control device supporting member is removable above the opening together with the exhaust gas control device attached to the mounting portion.

2. A work machine according to claim 1, wherein:
an L-shaped member that includes a frontward ranging portion ranging frontward and a downward ranging portion ranging downward, intersecting each other at a substantially right angle so as to form a substantially L-shaped section viewed from a side of the work machine, is disposed at a front end of the engine hood, and a front end of the reinforcing member extending along a front/rear direction is connected to a surface of the downward ranging portion located on a rear side;
the front end of the engine hood is supported with a lower surface of the frontward ranging portion set in contact with an upper surface of a hydraulic oil tank; and
a rear end of the engine hood is supported by the compartment cover supporting member.

3. A work machine according to claim 1, wherein:
a height of the top plate is set smaller than the height of an upper surface of the opening cover.

4. A work machine according to claim 1, wherein:
the exhaust gas control device supporting member includes a fastening member as the fastening portion, a mounting member as the mounting portion and an elastic member disposed between the fastening member and the mounting member, and the mounting member is supported by the fastening member via the elastic member.

* * * * *